J. V. JEPSON.
Steam Pressure Gage.
No. 45,247.
Patented Nov. 29, 1864.
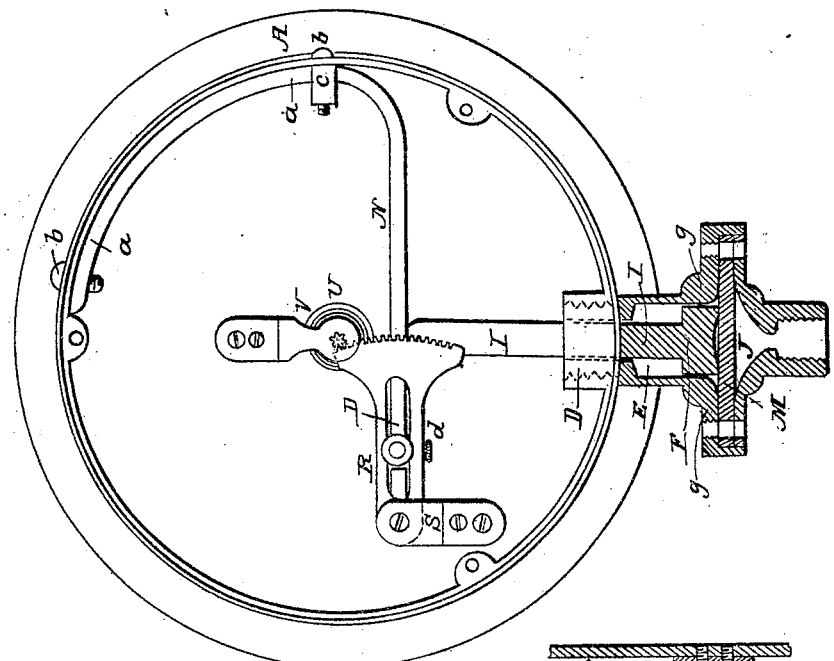
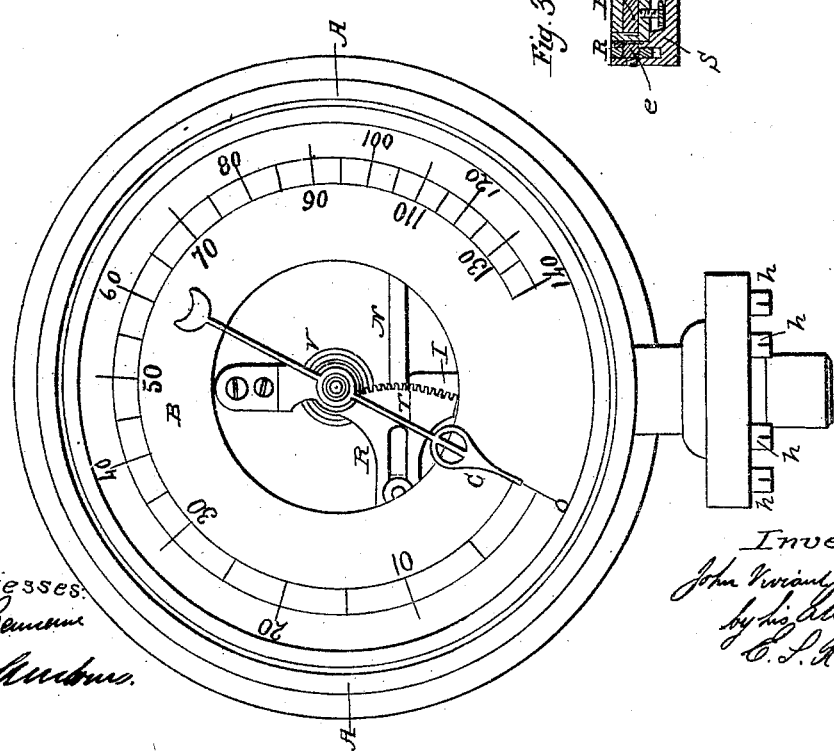

UNITED STATES PATENT OFFICE.

JOHN VIVIAN JEPSON, OF NEW YORK, N. Y.

IMPROVEMENT IN STEAM-PRESSURE GAGES.

Specification forming part of Letters Patent No. 45,247, dated November 29, 1864.

*To all whom it may concern:*

Be it known that I, JOHN VIVIAN JEPSON, a native of England, now residing in the city, county, and State of New York, have invented certain new and useful Improvements in Pressure-Gages; and I do hereby declare that the following is a full, clear, and exact description of the same, reference being had to the accompanying drawings, in which—

Figure 1 represents a front elevation of a steam-pressure gage constructed according to my invention. Fig. 2 represents a view of the same with the dial and index removed and with the diaphragm and the parts adjacent thereto in section, and Fig. 3 represents a transverse section of certain parts indicated by the same letters of reference as the same parts in the other two figures.

The object of my invention is to simplify the construction of pressure-gages and to increase their efficiency.

To this end the first part of my invention consists of the combination, in a pressure-gage, of a piston to receive and transmit the pressure, a flexible diaphragm to pack the piston, a spring to resist the pressure, and an index and dial to indicate the amount of pressure, this combination operating in such manner that the piston-rod acts directly on the spring, which, operating both as a spring and lever, not only resists the movement of the piston directly, but also transmits the movement to the index-gearing.

The second part of the invention consists of the combination of the piston which receives the pressure and the spring which resists it with the toothed sector and pinion which operate upon the index through the intervention of a slide, which, being a means of adjustment between the spring and the index, permits the movement of the index to be regulated without adjusting the spring, and also permits springs of the same force to be employed in the construction of gages indicating different ranges of pressure with about the same angular movement of the index.

The gage represented in the accompanying drawings embodies my invention. It has a case, A, of the usual circular form, to contain the dial B, the index C, and other parts of the gage, and it is closed at one side by a glass plate secured by a flanged ring and screws, as usual. At the lower side of this case there is an internal projection or block, D, to which the cylinder E, in which the piston F works, is screwed. The lower end of the cylinder is provided with a flange, *g g*, which is coupled by screws *h* to the flanged head J of the pipe which communicates with the reservoir of fluid whose pressure is to be measured.

The piston F is fitted to move freely in the cylinder E, and it rests upon a diaphragm, M, of india-rubber, which is inserted between the end of the cylinder E and the head J of the connecting-pipe, and is secured there air-tight by means of the coupling-screws *h*, which connect the flanges. The piston is provided with a rod, I, which extends through the upper end of the cylinder, and this end bored of smaller diameter than the remainder, to form a guide for the piston-rod. The upper end of the piston-rod is arranged to bear directly against a strong spring, N, having the form of an arm or lever projecting from one side of the case, to which the shank *a a* of the spring is secured by screws *b b* and a cross-bar, *c*, so that the spring is fixed rigidly in its position. This lever-spring projects beyond the end of the piston-rod, and its projecting end is fitted with a slide, P, which can be moved along the lever-spring for the purpose of adjusting the gage, and can be secured to it in any required position by a clamp-screw, *d*. The slide has a pivot, *e*, projecting from one of its sides in a position to enter into the slot 1 of an arm, R, which is pivoted at one end to a bracket, S, secured to the back of the gage-case, and is fitted at the other end with a toothed sector, T. The teeth of this sector engage in those of a pinion, U, secured to the arbor which carries the index, so that the movement of the spring N operates the index. In order to take up the play of the gearing, the index-arbor is provided with a spiral spring, V, of the usual construction.

When this gage is put in use, the pressure of the fluid upon the under side of the diaphragm M acts against the piston F, and is resisted by the lever-spring N, and, as the lever-spring N is stiff, the piston is permitted to move but a small distance for the total amount of pressure which the machine is arranged to indicate; hence the flexible diaphragm M is but slightly curved by the pressure, and as the curvature thus produced is so slight that the resistance of the material of the diaphragm to extension is scarcely brought into action, the diaphragm operates substantially as a frictionless packing, to prevent the leakage at the piston. As the spring N is stiff and rigid, it is not appreciably affected by the sudden movement of the gage or by jars; hence the gage may be connected with a locomotive boiler in rapid movement without the oscillation of the machine upon its springs producing an appreciable effect upon the spring or the index controlled by it, and consequently the wear of the parts due to continued oscillation is avoided. Moreover, as the piston-rod acts directly upon the spring, and the latter acts both as a spring to resist the pressure and as a lever to operate the sector and pinion which actuate the index, the construction of the parts is simple, and the cost is less than it would be if a greater number of parts were used to perform the required functions.

The interposition of the slide between the spring and index-gearing permits the regulation of the movement of the index without adjusting the spring; hence the spring may be rigidly secured to the case of the instrument, and the use and cost of means of adjusting it may be dispensed with. Moreover, springs of the same force may be employed in the construction of gages of different ranges of pressure but with the same movement of the index, because the slide may be adjusted to produce the same angular movement of the index with a greater or less movement of the spring, as may be required.

What I claim as my invention, and desire to secure by Letters Patent, is—

1. The combination, in a pressure-gage, of the piston, flexible diaphragm, spring, index, and dial, substantially as set forth.

2. The combination of the piston and spring with the toothed sector, pinion, and index through the intervention of a slide, substantially as set forth.

In testimony whereof I have hereunto set my hand.

JOHN VIVIAN JEPSON.

Witnesses:
JAMES O. MORSE,
EDMUND C. GAY.